United States Patent Office 3,167,544
Patented Jan. 26, 1965

3,167,544
PROCESS FOR THE PREPARATION OF NICOTINIC ACID ESTERS OF STEROID COMPOUNDS
Joachim Heider and Dietrich Jerchel, Biberach (Riss), Germany, assignors to Boehringer Ingelheim G.m.b.H., Ingelheim am Rhein, Germany, a corporation of Germany
No Drawing. Filed Dec. 17, 1963, Ser. No. 331,124
3 Claims. (Cl. 260—239.5)

This invention relates to steroid esters as well as to a novel method of preparing such steroid esters.

More particularly, the present invention relates to steroid esters of the formula

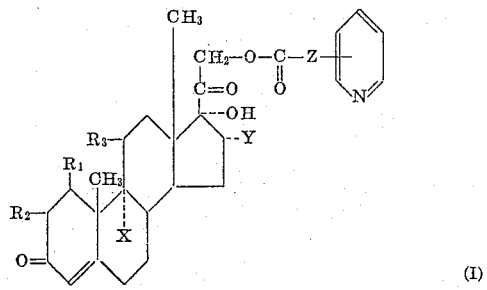

(I)

wherein
$R_1$ and $R_2$ are each hydrogen or, together with each other, form a double bond,
$R_3$ is =O or

X is hydrogen or fluorine,
Y is hydrogen, hydroxy, methyl or, together with the 17a-hydroxyl group, the grouping

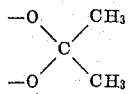

and
Z is —$CH_2$—,

or a carbon-to-carbon bond, as well as to a novel process which makes it possible to prepare such steroid esters in one continuous sequence of reaction steps, that is, without having to isolate the intermediate products.

The preparation of nicotinic acid esters of cortisone, hydrocortisone, prednisone and prednisolone is already known, as such, from Monatshefte für Chemie 92, 672–676 (1961). Further, in copending U.S. application Ser. No. 216,738, filed August 14, 1962, the preparation of, inter alia, esters of 9a-fluoro-hydrocortisone, dexamethasone and triamcinolone with pyridyl-carboxylic acids and picolyl-carboxylic acids is described. In both instances the preparation of the esters is effected by known esterification processes, preferably by reaction of the steroid alcohols with the corresponding carboxylic acid halides or anhydrides.

However, in these known processes it is initially necessary to prepare, in a separate reaction step, a reactive derivative of an acid of the formula

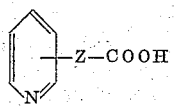

(II)

wherein Z has the same meanings as in Formula I. The preparation of such reactive derivatives is known to be inconvenient and, in most instances, proceeds with only moderate yields; in some instances, for example, when Z in the above formula II is —$CH_2$— or

or when the group —Z—COOH is in the 2-position, the preparation of such reactive derivatives is even practically impossible. Thus, steroid esters of these acids could be obtained by the known processess only through the considerably more involved reaction of a 21-halo steroid with a salt of the particular acid.

Moreover, in the case of various slowly reacting steroid alcohols, for instance, cortisone or prednisone, the known esterification processes required more severe conditions; for instance, reaction in the presence of phosphorus oxychloride or molten anhydride. Under these conditions the sensitive corticosteroids form side products which can be removed again only with great difficulty.

We have now discovered that all of the esters of the above-indicated general Formula I can be obtained at room temperature in one reaction step and with yields up to 80% and more, if steroid alcohols of the formula

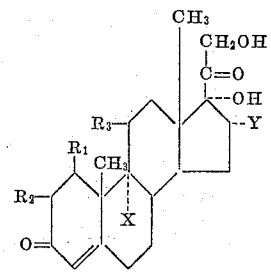

(III)

wherein $R_1$, $R_2$, $R_3$, X and Y have the same meanings as in Formula I, are esterified with an acid of the Formula II and with the aid of N,N'-thionyldi-imidazole. This novel process proceeds pusuant to the following reaction formulas:

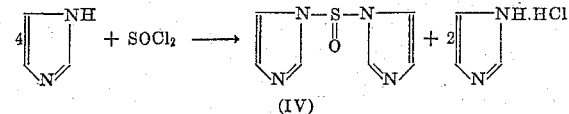

(IV)

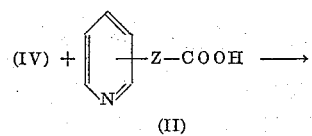

(II)

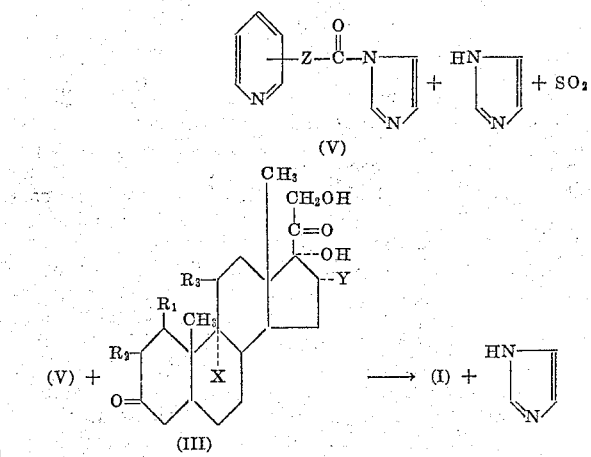

(III)

In these formulas $R_1$, $R_2$, $R_3$, X, Y and Z have the same meanings as in Formula I above.

The sequence of reactions is carried out at room temperature, advantageously in an inert organic solvent, preferably in tetrahydrofuran, because this solvent has the most favorable solution properties. Initially, four mols of imidazole are reacted with one mol of thionylchloride at room temperature; the precipitated imidazole-hydrochloride is separated by vacuum filtration, advantageously in the atmosphere of an inert gas, but it can also be recovered together with the imidazole which is formed after conclusion of the entire sequence of reactions. An acid of the Formula II is then added to the solution of the N,N'-thionyl-di-imidazole formed by the reaction, and the mixture is shaken at room temperature; after about half an hour a steroid alcohol of the Formula III is then added and the mixture is thereafter shaken at room temperature for 10–24 hours, preferably in the presence of an imidazole salt as a catalyst. The acid II and the steroid alcohol III are preferably used in equimolar amounts, and 1–3 mols of the N,N'-thionyl-di-imidizaole, preferably 2.7 mols, are used per mol of the two reactants. The point of time when the reaction has gone to completion may readily be determined by thin-film chromatography.

The reaction mixture can be very simply worked up by distilling off the inert solvent under reduced pressure and triturating the residue with water; the desired ester then precipitates out and may be separated by vacuum filtration and purified by recrystallization. The imidazole originally employed can be recovered virtually quantitatively from the aqueous filtrate. The yield of pure steroid ester is on the average 60–80% of theory or more.

The following examples further illustrate the invention and will enable others skilled in the art to understand it more completely. It should be understood, however, that the present invention is not limited to the particular examples given below.

For the sake of simplicity, the following non-proprietary names have been used:

Hydrocortisone for 11β,17α,21-trihydroxypregn-4-ene-3,20-dione,
Prednisone for 17α,21-dihydroxy-pregna-1,4-diene-3,11,20-trione,
Prednisolone for 11β,17α,21-trihydroxy-pregna-1,4-diene-3,20-dione,
9α-fluorohydrocortisone for 9α-fluoro-11β,17α,21-trihydroxy-pregn-4-ene-3,20-dione,
Dexamethasone for 9α-fluoro-16α-methyl-11β,17α,21-trihydroxy-pregna-1,4-diene-3,20-dione, and Triamcinolone for 9α-fluoro-11β,16α,17α,21-tetra-hydroxy-pregna-1,4-diene-3,20-dione.

EXAMPLE 1

*Preparation of pyridyl-2-carboxylic acid-(hydrocortisone-21')-ester*

0.3 cc. of thionylchloride were added dropwise to a solution of 1 gm. of imidazole in 60 cc. of tetrahydrofuran. The imidazole-hydrochloride precipitated thereby was separated by vacuum filtration in an atmosphere of nitrogen, and 0.45 gm. of dry pyridyl-2-carboxylic acid was added to the filtrate. After shaking the reaction mixture for a half hour it was admixed with 0.5 gm. of hydrocortisone. About 0.07 mol of sodium imidazole was added as a catalyst. The reaction mixture was then shaken for 21 hours at room temperature. On the basis of thin-film chromatographic determination, the reaction had gone to completion after this time. After evaporation of the reaction solution in a rotation evaporator the residue was triturated with water, and after separating the undissolved portion by vacuum filtration it was recrystallized from a mixture of ethanol and water. 0.5 gm. (77.6% of theory) of a white substance having a melting point of 243–246° C. (decomposition) was obtained. It was identified to be the steroid ester of the formula

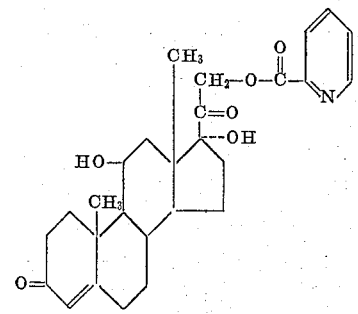

EXAMPLE 2

*Preparation of pyridyl-3-carboxylic acid-(hydrocortisone-21')-ester*

Using a procedure analogous to that described in Example 1, 0.6 gm. (93% of theory) of pyridyl-3-carboxylic acid-(hydrocortisone-21')-ester of the formula

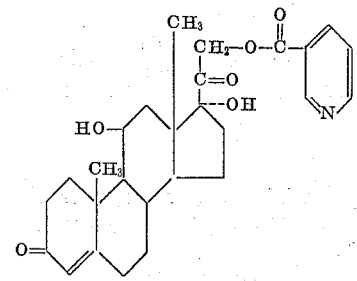

was obtained from pyridyl-3-carboxylic acid and hydrocortisone. The product was a white substance having a melting point of 210–212° C. (decomposition).

EXAMPLE 3

*Preparation of pyridyl-4-carboxylic acid-(hydrocortisone-21')-ester*

Using a procedure analogous to that described in Example 1, 0.5 gm. (77.6% of theory) of pyridyl-4-carboxylic acid-(hydrocortisone-21')-ester of the formula

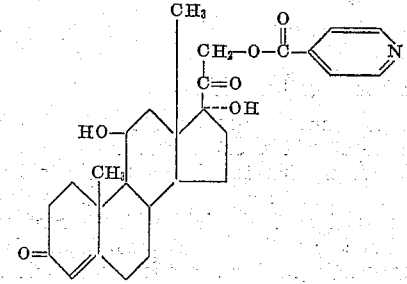

was obtained after 20 hours of shaking at room temperature from pyridyl-4-carboxylic acid and hydrocortisone. The white product had a melting point of 235–237° C. (decomposition).

EXAMPLE 4

*Preparation of pyridyl-3-glyoxylic acid-(hydrocortisone-21')-ester*

0.27 cc. of thionylchloride were added dropwise to a solution of 1 gm. of imidazole in 60 cc. of tetrahydrofuran. A precipitate of imidazole hydrochloride formed, which was filtered off. The filtrate, a solution of N,N'-thionyl-diimidazole in tetrahydrofuran, was admixed with 0.55 gm. of pyridyl-3-glyoxylic acid and 0.5 gm. of hydrocortisone, as described in Example 1. After a reaction period of 6 hours and working up the reaction mixture as described in Example 1, 0.4 gm. (59% of theory) of a substance having a melting point of 209–211° C. (decomposition) was obtained. It was identified to be the steroid ester of the formula

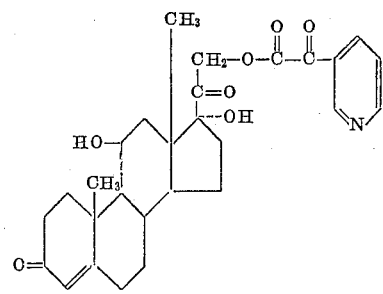

EXAMPLE 5

*Preparation of pyridyl-3-acetic acid-(hydrocortisone-21')-ester*

0.27 cc. of thionylchloride, 0.5 gm. of pyridyl-3-acetic acid and 0.5 gm. of hydrocortisone were reacted with a solution of 1 gm. of imidazole in tetrahydrofuran in a manner analogous to that described in Example 1, and the reaction mixture was worked up. 0.55 gm. (82.6% of theory) of a substance having a melting point of 236–238° C. (decomposition) was obtained. It was identified to be the steroid ester of the formula

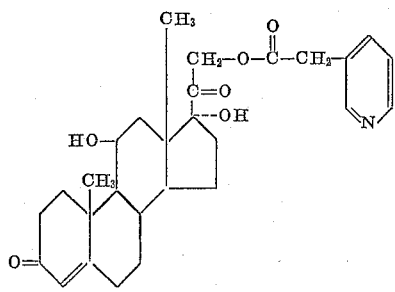

EXAMPLE 6

*Preparation of pyridyl-2-carboxylic acid-(prednisolone-21')-ester*

0.27 cc. of thionylchloride, 0.45 gm. of pyridyl-2-carboxylic acid and 0.5 gm. of prednisolone were reacted for six hours at 40° C. and for 28 hours at room temperature with a solution of 1 gm. of imidazole in tetrahydrofuran in a manner analogous to that described in Example 1, and the reaction mixture was worked up. A substance having a melting point of 261–264° C. (decomposition) was obtained. It was identified to be the steroid ester of the formula

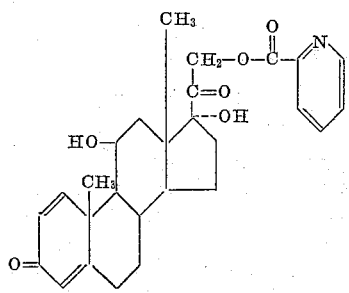

The yield was 65% of theory.

EXAMPLE 7

*Preparation of pyridyl-4-carboxylic acid-(prednisolone-21')-ester*

0.54 cc. of thionylchloride, 0.45 gm. of isonicotinic acid and 0.5 gm. of prednisolone were reacted for 56 hours at room temperature with a solution of 2 gm. of imidazole in tetrahydrofuran in a manner analogous to that described in Example 1, and the reaction mixture was worked up. The product had a melting point of 240–243° C. (decomposition). It was identified to be the steroid ester of the formula

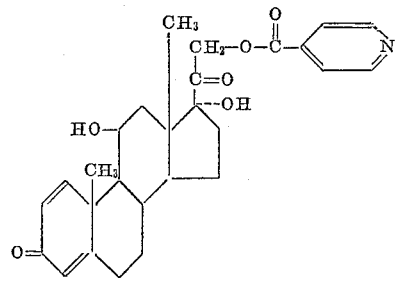

EXAMPLE 8

*Preparation of pyridyl-3-acetic acid-(prednisolone-21')-ester*

A solution of 1 gm. of imidazole in tetrahydrofuran, 0.27 cc. of thionylchloride, 0.5 gm. of pyridyl-3-acetic acid and 0.5 gm. of prednisolone were reacted for 16 hours at room temperature in a manner analogous to that described in Example 1, and the reaction mixture was worked up. The product had a melting point of 239–241° C. (decomposition). It was identified to be the steroid ester of the formula

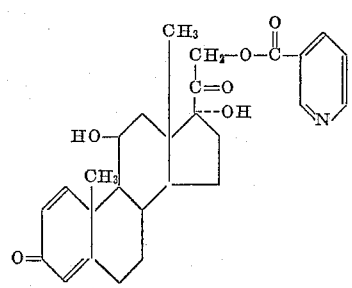

EXAMPLE 9

*Preparation of pyridyl-2-carboxylic acid-(dexamethasone-21')-ester*

A solution of 0.5 gm. of imidazole in tetrahydrofuran, 0.14 cc. of thionylchloride, 0.12 gm. of pyridyl-2-carboxylic acid and 0.25 gm. of dexamethasone were reacted for 20 hours at 40° C. in a manner analogous to that described in Example 1, and the reaction mixture was worked up. The product had a melting point of 254° C. It was identified to be the steroid ester of the formula

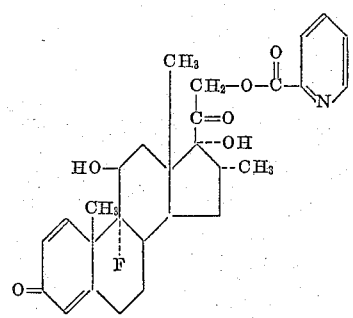

EXAMPLE 10

*Preparation of pyridyl-2-carboxylic acid-(triamcinolone-21')-ester*

A solution of 0.5 gm. of imidazole in tetrahydrofuran was reacted with 0.14 cc. of thionylchloride, 0.23 gm. of pyridyl-2-carboxylic acid and 0.25 gm. of triamcinolone for 20 hours at 40° C. in a manner analogous to that described in Example 1, and the reaction mixture was worked up. The product had a melting point of 207° C.

It was identified to be the steroid ester of the formula

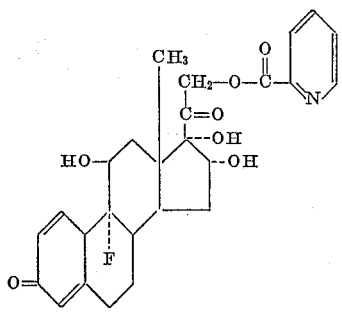

EXAMPLE 11

*Preparation of pyridyl-3-carboxylic acid-(prednisolone-21')-ester*

A solution of 0.38 gm. of imidazole in 45 cc. of tetrahydrofuran was admixed with 0.4 gm. of pyridyl-3-carboxylic acid chloride. After separating by vacuum filtration the imidazole-hydrochloride which had precipitated, 0.5 gm. of prednisolone was added to the filtrate which contained N-nicotinyl-imidazolide. After 16 hours of standing at room temperature the reaction mixture was admixed with a solution consisting of 1 gm. of imidazole in tetrahydrofuran, 0.3 cc. of thionylchloride and 0.45 gm. of nicotinic acid, and the resulting mixture was maintained at 40° C. for an additional 60 hours. Upon working up the reaction mixture as described in Example 1, a white substance having a melting point of 218–221° C. was obtained. It was identified to be the steroid ester of the formula

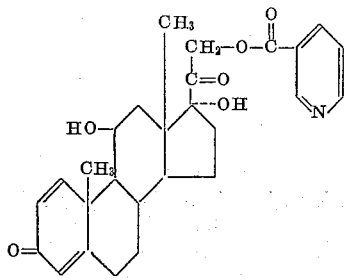

The yield was 32% of theory.

EXAMPLE 12

*Preparation of pyridyl-2-carboxylic acid-(triamcinolone-16',17'-acetonide-21')-ester*

A solution of 0.5 gm. of imidazole in dry tetrahydrofuran was admixed with 0.14 cc. of thionylchloride, 0.24 gm. of pyridyl-2-carboxylic acid and 0.25 gm. of triamcinolone-16,17-acetonide as in Example 1, and the reaction mixture was worked up as previously described after 8 days of standing. The reaction product was recrystallized from a mixture of ethanol and water. The white substance thus obtained had a melting point of 158–161° C. It was identified to be the steroid ester of the formula

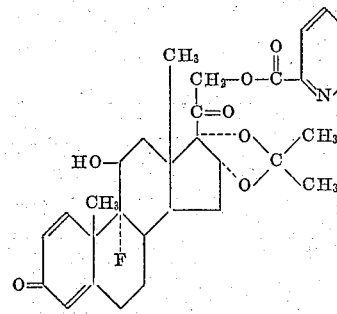

The yield was 32% of theory.

EXAMPLE 13

*Preparation of pyridyl-3-acetic acid-(dexamethasone-21') ester*

A solution of 0.5 gm. of imidazole in dry tetrahydrofuran was reacted with 0.14 cc. of thionylchloride, 0.25 gm. of pyridyl-3-acetic acid and 0.25 gm. of dexamethasone in a manner analogous to that described in Example 1, and the reaction mixture was worked up after 20 days of standing. The reaction product was recrystallized from a mixture of ethanol and water. The white substance obtained thereby had a melting point of 128–131° C. (decomposition). It was identified to be the steroid ester of the formula

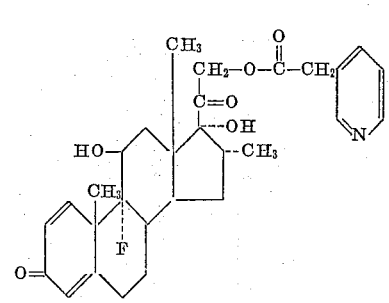

EXAMPLE 14

*Preparation of isonicotinic acid-(cortisone 21')-ester*

A solution of 1 gm. of imidazole in 45 cc. of tetrahydrofuran was admixed with 0.27 cc. of thionylchloride, 0.45 gm. of isonicotinic acid, 0.25 gm. of cortisone and 0.6 cc. of sodium imidazole in a manner analogous to that described in Example 1, and after 15 hours of standing the reaction mixture was worked up. The white reaction product had a melting point of 137–139° C. It was identified to be the steroid ester of the formula

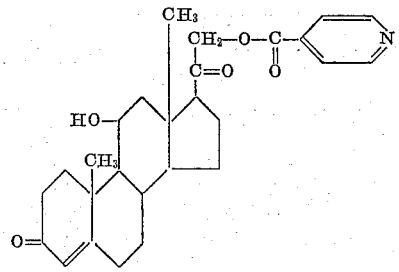

The yield was 61.8% of theory.

EXAMPLE 15

*Preparation of isonicotinic acid-(prednisone-21')-ester*

Using a procedure analogous to that described in the preceding example for the preparation of isonicotinic acid-(cortisone-21')-ester, but using prednisone in place of cortisone, a reaction product having a melting point of 169° C. was obtained. It was identified to be the steroid ester of the formula

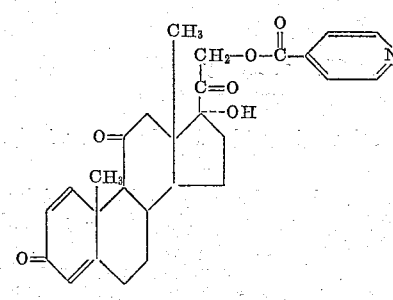

The yield was 58.6% of theory.

EXAMPLE 16

*Preparation of pyridyl-3-glyoxylic acid-(prednisolone-21')-ester*

A solution of 1 gm. of imidazole in tetrahydrofuran was reacted at room temperature for 16 hours with 0.27 cc. of thionylchloride, 0.55 gm. of pyridyl-3-glyoxylic acid and 0.5 gm. of prednisolone in a manner analogous to that described in Example 1, and the reaction mixture was worked up. After recrystallization from aqueous ethanol, the reaction product had a melting point of 212° C. (decomposition). It was identified to be the steroid ester of the formula

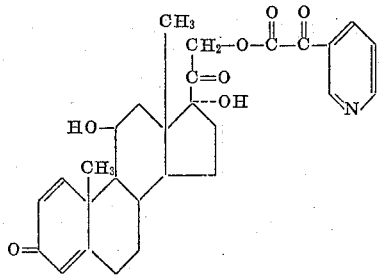

EXAMPLE 17

*Preparation of pyridyl-3-acetic acid-(9'α-fluorohydrocortisone-21')-ester*

A mixture of 2 gm. of imidazole dissolved in tetrahydrofuran, 0.54 gm. of thionylchloride, 0.5 gm. of 9α-fluorohydrocortisone and 1 gm. of pyridyl-3-acetic acid was shaken for 30 hours at 25° C., and the reaction mixture was then worked up as described in Example 1. The reaction product had a melting point of 145° C. It was identified to be the steroid ester of the formula

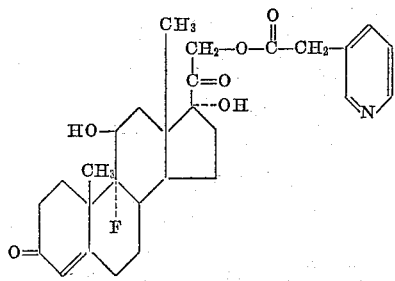

The yield was 64% of theory.

EXAMPLE 18

*Preparation of pyridyl-3-acetic acid-(triamcinolone-16'α,17'α-acetonide-21')-ester*

A mixture of 0.43 gm. of triamcinolone-16α,17α-acetonide and 1 gm. of pyridyl-3-acetic acid was reacted for 24 hours at room temperature in a manner analogous to that described in Example 1, and the reaction mixture was worked up. The reaction product had a melting point of 284° C. It was identified to be the steroid ester of the formula

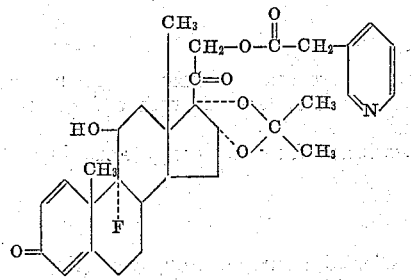

The yield was 74% of theory.

EXAMPLE 19

*Preparation of isonicotinic acid-(dexamethasone-21')-ester*

A mixture of 0.25 gm. of dexamethasone and 0.13 gm. of isonicotinic acid was reacted for 24 hours at room temperature in a manner analogous to that described in Example 1, and the reaction mixture was worked up. The reaction product had a melting point of 256° C. It was identified to be the steroid ester of the formula

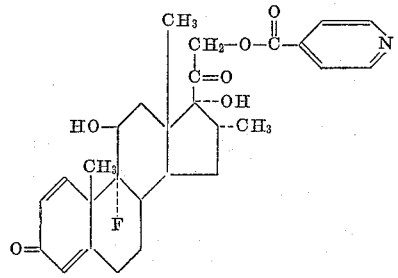

The yield was 88.8% of theory.

EXAMPLE 20

*Preparation of pyridyl-3-carboxylic acid-(dexamethasone-21')-ester*

A mixture of 0.25 gm. of dexamethasone and 0.13 gm. of pyridyl-3-carboxylic acid was reacted for 24 hours at room temperature in a manner analogous to that described in Example 1, and the reaction mixture was then worked up. The reaction product had a melting point of 257° C. It was identified to be the steroid ester of the formula

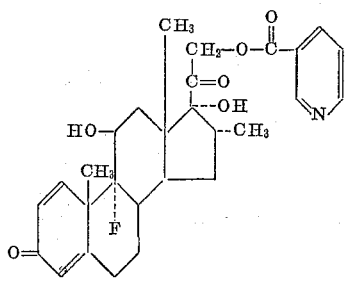

The yield was 81% of theory.

The steroid esters prepared by the novel process according to the present invention have useful pharmacodynamic properties. More particularly, they exhibit highly effective antiphlogistic activities.

While the present invention has been illustrated with the aid of certain specific embodiments thereof, it will be readily apparent to others skilled in the art that the invention is not limited to those specific embodiments, and that various changes and modifications may be made without departing from the spirit of the invention or the scope of the appended claims.

We claim:

1. The method of preparing a steroid ester of the formula

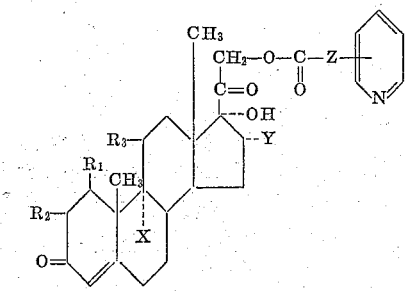

wherein $R_1$ and $R_2$ are selected from the group consisting of hydrogen and, together with each other, a double bond, $R_3$ is selected from the group consisting of =O and

X is selected from the group consisting of hydrogen and fluorine,

Y is selected from the group consisting of hydrogen, hydroxyl, methyl and, together with the 17α-OH,

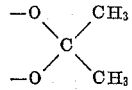

and

Z is selected from the group consisting of carbon-to-carbon bond, —CH₂— and

which comprises reacting N,N'-thionyl-di-imidazole with a piperidyl-carboxylic acid of the formula

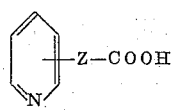

wherein Z has the meanings defined above, to form an imidazolide of the formula

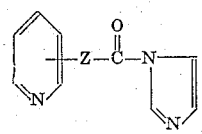

wherein Z has the meanings defined above, and reacting said imidazolide with a steroid alcohol of the formula

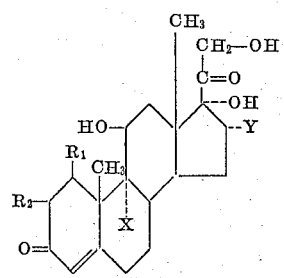

wherein $R_1$, $R_2$, $R_3$, X and Y have the meanings defined above, and recovering the reaction product.

2. The method of preparing a steroid ester of the formula

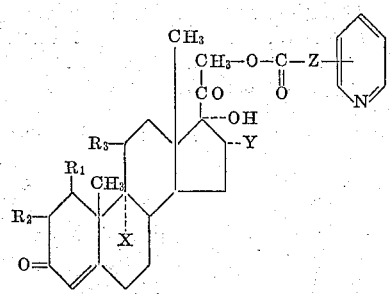

wherein $R_1$ and $R_2$ are selected from the group consisting of hydrogen and, together with each other, a double bond, $R_3$ is selected from the group consisting of =O and

X is selected from the group consisting of hydrogen and fluorine,

Y is selected from the group consisting of hydrogen, hydroxyl, methyl and, together with the 17α-OH,

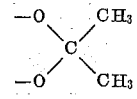

and

Z is selected from the group consisting of carbon-to-carbon bond, —CH₂— and

which comprises reacting N,N'-thionyl-di-imidazole at room temperature with a piperidyl-carboxylic acid of the formula

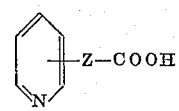

wherein Z has the meanings defined above, to form an imidazolide of the formula

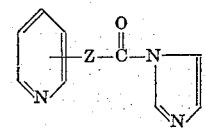

wherein Z has the meanings defined above, and reacting said imidazolide at room temperature and in the presence of an alkali metal salt of imidazole and an inert solvent with a steroid alcohol of the formula

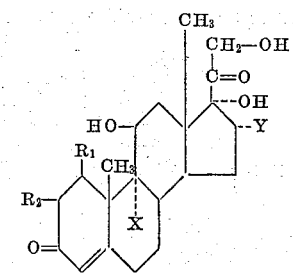

wherein $R_1$, $R_2$, $R_3$, X and Y have the meanings defined above, and recovering the reaction product.

3. The method of preparing a steroid ester of the formula

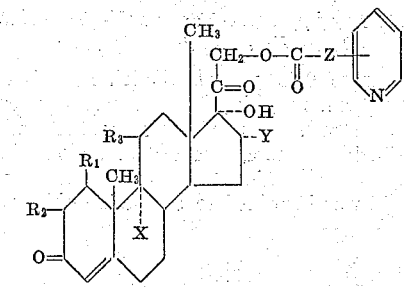

wherein $R_1$ and $R_2$ are selected from the group consisting of hydrogen and, together with each other, a double bond, $R_3$ is selected from the group consisting of =O and

X is selected from the group consisting of hydrogen and fluorine,

Y is selected from the group consisting of hydrogen, hydroxyl, methyl and, together with the 17α-OH,

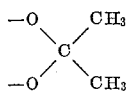

and

Z is selected from the group consisting of carbon-to-carbon bond, —CH₂— and

which comprises reacting N,N'-thionyl-di-imidazole at room temperature with a piperidyl-carboxylic acid of the formula

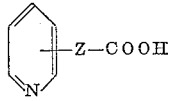

wherein Z has the meanings defined above, to form an imidazolide of the formula

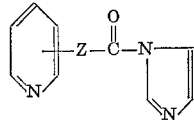

wherein Z has the meanings defined above, and reacting said imidazolide at room temperature and in the presence of an alkali metal salt of imidazole and a tetrahydrofuran with a steroid alcohol of the formula

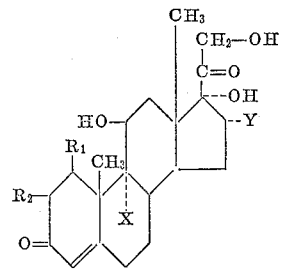

wherein $R_1$, $R_2$, $R_3$, X and Y have the meanings defined above, the molar ratio of the reactants being 1–3 mols of N,N'-thionyl-di-imidazole per mol of piperidyl-carboxylic acid and per mol of steroid alcohol, and recovering the reaction product.

No references cited.